United States Patent [19]

Oishi et al.

[11] 4,389,010

[45] Jun. 21, 1983

[54] MAGNETIC TAPE GUIDE MEANS

[75] Inventors: Kengo Oishi; Masayoshi Moriwaki; Osamu Suzuki; Kouji Kamiyama, all of Odawara, Japan

[73] Assignee: Fuji Photo Film Co., Ltd., Kanagawa, Japan

[21] Appl. No.: 242,210

[22] Filed: Mar. 10, 1981

[30] Foreign Application Priority Data

Mar. 10, 1980 [JP] Japan .................................. 55-30021

[51] Int. Cl.$^3$ ........................ B65H 23/04; G03B 1/48
[52] U.S. Cl. ....................................... 226/196; 242/76
[58] Field of Search ...................... 226/190, 193, 196; 242/76, 197–200, 208–210; 360/95, 96, 132

[56] References Cited

U.S. PATENT DOCUMENTS 4,101,096  7/1978  Oishi et al. ........................... 242/199
4,228,940 10/1980  Umehara .............................. 226/196

FOREIGN PATENT DOCUMENTS 776400  6/1957  United Kingdom ................ 226/193

Primary Examiner—Leonard D. Christian
Attorney, Agent, or Firm—Sughrue, Mion, Zinn, Macpeak and Seas

[57] ABSTRACT

A magnetic tape guide means is disclosed having formed on the surface thereof for contact with a moving tape substantially hemispherical projections having diameters or major axis of from 0.5 to 5 μm and a distribution density of from 10,000 to 100,000 projections per square millimeter.

6 Claims, 3 Drawing Figures

MAGNETIC TAPE GUIDE MEANS

BACKGROUND OF THE INVENTION

This invention relates to an improved guide means surface in the travelling path of a magnetic tape.

"Travelling path" as used in this invention is formed by guide means such as guide pins, guide rolls, tension rolls, and guide plates so that magnetic tape can be transported continuously in a given direction in an audio or video record/reproduce system, dubbing system, or tape takeup system in tape processing steps.

The recent development of high-performance audio and video record/reproduce systems has enabled many continuous hours or recording/reproducing operation, and the record/reproduce period, which originally had been only 2 hours with Betamax or VHS video tape cassette recording systems, has now been extended to as long as 6 hours, and is expected to be extended up to 9 hours in the near future.

To achieve such extended recording and reproduction, a magnetic tape with increased effective recording area is necessary. To meet this requirement, two methods have been proposed: one method is to reduce the thickness of the magnetic tape, to thereby increase the length of the tape that can be stored in a given space; and the other method is to provide increased recording density by reducing the width of tracks travelled by the magnetic head or by slowing the tape transport speed. But to increase the effective recording area of the magnetic tape, several problems must be solved, such as low mechanical strength and poor physical characteristics due to a thin thickness of the tape, a low electromagnetic conversion efficiency, and a narrow permissible range of dropouts due to the change in the width of tracks or tape speed.

Conventional means to solve these problems include using tape guide means wherein the surface that contacts the magnetic tape is made as smooth as possible to prevent the development of abrasions on the tape surface, increasing the surface hardness of the tape contact face to minimize shaving or wear caused by abrasion of the magnetic tape, and using a material having low affinity with the magnetic tape. However, the surface characteristics of the magnetic tape to be guided, particularly, its surface roughness, hardness, lubricity, and antistatic properties, vary considerably from one type of tape to another, so tape cassette manufacturers have found it necessary to use guide means that are best suited to the specific type of magnetic tape expected to be used therewith, with the result that parts control becomes complicated and the manufacturing cost increases. Another problem with the ability of a particular guide means to guide only one type of tape is that it is very difficult to use more than one type of magnetic tape on the same record/reproduce system.

A further defect of the conventional tape guide means is described by reference to accompanying FIGS. 1 and 2, which show a conventional guide pin 1, or one kind of nonmagnetic cylindrical guide means, that forms part of a magnetic tape T path. Conventionally, guide pin 1 is a cylindrical member made of nonmagnetic stainless steel or a plastic resin impregnated with silicone. The outer peripheral surface of the member is finished to a surface roughness of about 0.2 S to 0.8 S (0.2 to 0.5 $\mu$m) by barrel finishing, centerless grinding, superfinishing, vanishing or other finishing techniques. FIG. 2 is an enlarged schematic representation of the surfaces of such a conventional guide pin 1 in contact with a magnetic tape T. As shown, the surface S of the guide pin has a cross section with sharp sawteeth, and the ridges of the sawteeth produce abrasions on the surface S of the tape T that cause dropouts. To provide flat ridges by further grinding not only results in high processing costs but it often causes uneven running of the magnetic tape T because the tape sticks or adheres to the flat ridges. A plastic guide pin is not capable of retaining the desired surface roughness for an extended period because its surface is shaven by the abrasion of the magnetic tape, partly due to its low surface hardness, and the shavings therefrom are transferred onto the tape T to induce dropouts.

SUMMARY OF THE INVENTION

The primary object of this invention is to provide a tape guide means of a simple construction that is free from the defects of conventional tape guide means and which can be manufactured at low cost.

The object can be achieved by a magnetic tape guide means having formed on the surface thereof for contact with a moving magnetic tape substantially hemispherical projections having a diameter or major axis of from 0.5 to 5 $\mu$m and a distribution density of 10,000 to 100,000 projections per square millimeter.

DETAILED DESCRIPTION OF THE INVENTION

Figure 1:
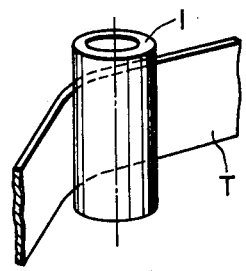
FIG. 1 a perspective view of a conventional guide pin structure.
Figure 2:
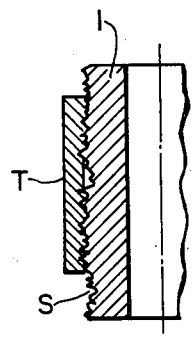
FIG. 2 is an enlarged cross section of the surface of the guide pin of FIG. 1.
Figure 3:
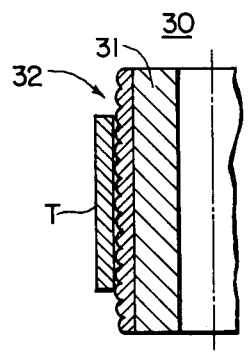
FIG. 3 is an enlarged cross section of the surface of a guide pin of this invention.

One embodiment of a tape guide means according to this invention is hereunder described by reference to FIG. 3 which is an enlarged longitudinal cross section of the essential part of a guide pin 30 according to this invention. The guide pin 30 is made up of a body member 31, which is the same as is shown in FIGS. 1 and 2, and a group of hemispherical projections 32 formed on the outer periphery of the member 31.

In addition to nonmagnetic stainless steel or silicone-impregnated plastic resin, the member 31 may be made of aluminum, brass, ceramics, glass or any other material that is nonmagnetic and is capable of maintaining the desired dimensional accuracy and strength. To provide a group of substantially hemispheriacal projections on the outer periphery of the member 31, a material that can be deposited on the outer periphery of the member 31 to provide strong bond, which has low coefficient of friction with respect to the magnetic tape T and which has a reasonable surface hardness, is formed on the member 31 by electroplating, chemical plating, gas plating, ion sputtering, flushing, sintering after coating, frame plating, or sintering from alcoholate. The materials for the projections 32 include metals such as chromium, nickel, tungsten and titanium, metal oxides such as $Al_2O_3$, $ZrO_2$, $Cr_2O_3$, $\alpha\text{-}Fe_2O_3$ and $TiO_2$ which may be used independently or in combination, or electrically conductive dry graphite lubricant or carbon graphite having high hardness.

The desirable Materials for projections 32 are deposited on the outer periphery of the member 31 as their particles get spherical due to the surface tension. The particles are deposited thereon and further grow to form a layer. Therefore, by selecting proper deposition conditions, projections 32 having substantially spherical surfaces can be obtained.

Unlike the conventional guide pin 1 having saw-toothed outer peripheral cross section S, the guide means of this invention is such that the topmost facets of the round projections 32 contact the surface of the running magnetic tape T, so that the guide means can guide the tape along the tape path very smoothly without causing any damage to the tape. Secondly, the friction of the guide means of this invention against the magnetic tape T is held to minimum with a low load dependency of $\mu$ value, because the projections 32 contact with the tape over an area much smaller than in the case of the conventional guide pin 1. Thirdly, a thin layer of entrained air between the projections 32 and the magnetic tape T minimizes serpentine movement of the tape.

For the purpose of this invention, 10,000 to 100,000 projections having a diameter of from 0.5 to 5 $\mu$m are desirably formed in one square millimeter of the member 31. Generally similar results are obtained if the hemispherical projections are replaced by trapezoidal projections. For the desired size and distribution density of the trapezoidal projections, the same values specified for the spherical projections are desirable.

It is to be understood that the guide means of this invention described above can achieve similar results even if it is applied to magnetic tape guide means other than a guide pin, such as rotary guide rolls or guide members having flat surfaces.

The advantages of the guide means of this invention are now described in greater detail by reference of the following examples and comparative example, which are provided here for illustrative purposes only, and are not intended to limit the scope of the invention.

EXAMPLE I

The outer surfaces of SUS-316 cylinders having an outer diameter of 6.0 mm and an overall length of 16.0 mm were plated with hard chromium by electrolytic plating to provide guide pins having hemispherical projections the diameters and distribution densities of which are indicated in Table 1 below. A VHS video cassette recorder was operated using a magnetic tape (VHS cassette T-120E of Fuji Photo Film Co., Ltd.) guided by the guide pins at an angle of about 180 degrees, and the dynamic coefficient of friction ($\mu$ value) was measured and the number of dropouts was counted. The surface of each guide pin that contacted the tape was visually checked for the presence of abrasions and shaving. The results are set forth in Table 1.

COMPARATIVE EXAMPLE I

Cylinders of SUS-316 having the same dimensions as used in Example I were finished to provide a surface roughness of 0.4 S. The guide pins so prepared were subjected to the same operating test as in Example 1, and the dynamic friction coefficient was measured and the number of dropouts counted. The surface of each guide pin that contacted the tape was visually inspected for the presence of abrasions and shaving. The results are shown in Table 1.

EXAMPLE II

The outer surface of ceramic cylinders having an outer diameter of 6.0 mm and an overall length of 16.0 mm was finished to a surface roughness of 0.8 S and immersed in a 0.5 mol $TiO.4SiO_2$ solution at 70° C. that consisted of 100 parts of isoamyl alcohol, 14 parts of methyl silicate $[Si(OCH_3)_4]$ and 30 parts of isopropyl orthotitanate $Ti[(CH_3)_2 CHO]_4$. The cylinders thus provided with a $TiO.4SiO_2$ coating were left to stand at 25° C. and 75% RH (relative humidity) and heated to 750° C. for 48 hrs. and were heated for 5 hrs. in an electric oven to form guide pins having hemispherical $TiO.4SiO_2$ projections on the outer surface. The guide pins were set in a VHS video cassette recorder to guide magnetic tape (VHS cassette T-120E of Fuji Photo Film Co., Ltd.), and subjected to the same tests as in Example I. The test results are set forth in Table 1.

TABLE 1

| Sample No. | Ex. | Material of cylinder | Method of surface finishing | Projections Diameter μm | Distribution density projections/mm² | Surface roughness S | μ Value | Load dependency of μ value | Tape abrasions | Number of dropouts | Shaving |
|---|---|---|---|---|---|---|---|---|---|---|---|
| 1 | I | SUS-316 | electroplating | 0.1 | 5,000 | | 0.23 | present | × | 32 | Δ |
| 2 | " | " | electroplating | " | 10,000 | | 0.24 | " | × | 20 | Δ |
| 3 | " | " | electroplating | " | 100,000 | | 0.24 | " | × | 25 | Δ |
| 4 | " | " | electroplating | " | 150,000 | | 0.24 | " | o | 16 | o |
| 5 | " | " | electroplating | 0.3 | 5,000 | | 0.23 | " | × | 25 | Δ |
| 6 | " | " | electroplating | " | 10,000 | | 0.20 | " | Δ | 22 | Δ |
| 7 | " | " | electroplating | " | 100,000 | | 0.21 | " | o | 19 | o |
| 8 | " | " | electroplating | " | 150,000 | | 0.20 | " | × | 27 | o |
| 9 | " | " | electroplating | 0.5 | 5,000 | | 0.19 | " | × | 20 | Δ |
| 10 | " | " | electroplating | " | 8,000 | | 0.19 | absent | Δ | 18 | o |
| 11 | " | " | | " | 10,000 | | 0.18 | " | o | 12 | o |
| 12 | " | " | | " | 100,000 | | 0.17 | " | o | 10 | o |
| 13 | " | " | | " | 150,000 | | 0.20 | present | o | 5 | o |
| 14 | " | " | | 1.0 | 5,000 | | 0.18 | " | o | 20 | Δ |

TABLE 1-continued

|  |  |  |  | State of surface |  |  | Results |  |  |  |
|---|---|---|---|---|---|---|---|---|---|---|
|  |  |  |  | Projections |  | Surface |  | Load |  |  |
| Sample No. | Ex. | Material of cylinder | Method of surface finishing | Diameter μm | Distribution density projections/mm² | rough- ness S | μ Value | dependency of μ value | Tape abrasions | Number of dropouts | Shaving |
| 15 | " | " |  | " | 8,000 |  | 0.17 | absent | o | 10 | o |
| 16 | " | " |  | " | 10,000 |  | 0.18 | " | o | 8 | o |
| 17 | " | " |  | " | 100,000 |  | 0.19 | " | o | 12 | o |
| 18 | " | " |  | " | 150,000 |  | 0.20 | present | o | 22 | o |
| 19 | " | " | electro-plating | 5.0 | 5,000 |  | 0.20 | " | Δ | 15 | o |
| 20 | " | " | electro-plating | " | 8,000 |  | 0.18 | absent | o | 8 | o |
| 21 | " | " | electro-plating | " | 10,000 |  | 0.17 | " | o | 12 | o |
| 22 | " | " | electro-plating | " | 100,000 |  | 0.19 | " | o | 12 | o |
| 23 | " | " | electro-plating | " | 150,000 |  | 0.21 | present | Δ | 20 | o |
| 24 | " | " | electro-plating | 7.0 | 5,000 |  | 0.22 | " | Δ | 15 | o |
| 25 | " | " | electro-plating | " | 8,000 |  | 0.22 | " | Δ | 20 | o |
| 26 | " | " | electro-plating | " | 10,000 |  | 0.22 | " | Δ | 25 | o |
| 27 | " | " | electro-plating | " | 100,000 |  | 0.23 | " | × | 22 | o |
| 28 | " | " | electro-plating | " | 150,000 |  | 0.22 | " | × | 25 | o |
| 29 | II | Ceramic | Sintering from alcoholate | 0.1 | 5,000 |  | 0.22 | " | × | 40 | o |
| 30 | " | " | Sintering from alcoholate | " | 10,000 |  | 0.20 | " | × | 35 | o |
| 31 | " | " | Sintering from alcoholate | " | 100,000 |  | 0.19 | " | × | 32 | o |
| 32 | " | " | Sintering from alcoholate | " | 150,000 |  | 0.19 | " | × | 30 | o |
| 33 | " | " | Sintering from alcoholate | 0.3 | 5,000 |  | 0.22 | absent | × | 27 | o |
| 34 | " | " | Sintering from alcoholate | " | 10,000 |  | 0.20 | " | Δ | 20 | o |
| 35 | " | " | Sintering from alcoholate | " | 100,000 |  | 0.18 | " | o | 15 | o |
| 36 | " | " | Sintering from alcoholate | " | 150,000 |  | 0.19 | " | Δ | 22 | o |
| 37 | " | " | Sintering from alcoholate | 0.5 | 5,000 |  | 0.19 | " | Δ | 25 | o |
| 38 | " | " | Sintering from alcoholate | " | 8,000 |  | 0.20 | " | o | 15 | o |
| 39 | " | " | Sintering from alcoholate | " | 10,000 |  | 0.16 | " | o | 8 | o |
| 40 | " | " | Sintering from alcoholate | " | 100,000 |  | 0.17 | " | o | 8 | o |
| 41 | " | " | Sintering from alcoholate | " | 150,000 |  | 0.20 | " | o | 18 | o |
| 42 | " | " | Sintering from alcoholate | 1.0 | 5,000 |  | 0.19 | " | o | 12 | o |
| 43 | " | " | Sintering from alcoholate | " | 8,000 |  | 0.19 | " | o | 8 | o |
| 44 | " | " | Sintering from alcoholate | " | 10,000 |  | 0.16 | " | o | 8 | o |
| 45 | " | " | Sintering from alcoholate | " | 100,000 |  | 0.17 | " | o | 10 | o |
| 46 | " | " | Sintering | " | 150,000 |  | 0.18 | " | Δ | 15 | o |

TABLE 1-continued

| Sample No. | Ex. | Material of cylinder | Method of surface finishing | State of surface Projections Diameter μm | Distribution density projections/mm² | Surface roughness S | Results μ Value | Load dependency of μ value | Tape abrasions | Number of dropouts | Shaving |
| --- | --- | --- | --- | --- | --- | --- | --- | --- | --- | --- | --- |
| 47 | " | " | Sintering from alcoholate | 5.0 | 5,000 | | 0.19 | " | Δ | 15 | o |
| 48 | " | " | Sintering from alcoholate | " | 8,000 | | 0.16 | " | o | 10 | o |
| 49 | " | " | Sintering from alcoholate | " | 10,000 | | 0.17 | " | o | 8 | o |
| 50 | " | " | Sintering from alcoholate | " | 100,000 | | 0.18 | " | o | 8 | o |
| 51 | " | " | Sintering from alcoholate | " | 150,000 | | 0.19 | " | Δ | 16 | o |
| 52 | " | " | Sintering from alcoholate | 7.0 | 5,000 | | 0.19 | present | × | 30 | o |
| 53 | " | " | Sintering from alcoholate | " | 8,000 | | 0.22 | " | Δ | 25 | o |
| 54 | " | " | Sintering from alcoholate | " | 10,000 | | 0.18 | " | o | 20 | o |
| 55 | " | " | Sintering from alcoholate | " | 100,000 | | 0.19 | " | Δ | 27 | o |
| 56 | " | " | Sintering from alcoholate | " | 150,000 | | 0.20 | " | × | 32 | o |
| 57 | Comp. Ex. I | SUS-316 | Super finishing | | | 0.4 S | 0.23 | present | Δ | 19 | Δ |
| 58 | Comp. Ex. I | " | Super finishing | | | " | 0.23 | " | Δ | 20 | Δ |
| 59 | Comp. Ex. I | " | Super finishing | | | " | 0.25 | " | Δ | 25 | Δ ~ × |
| 60 | Comp. Ex. I | " | Super finishing | | | " | 0.22 | " | o | 18 | Δ |

The measurement of the dynamic coefficient of friction (μ value) and counting of dropouts were conducted in the manner described below. The method of evaluation of the development of abrasions and shaving is also stated below.

(1) μ value . . . The μ value was measured with a dynamic friction tester manufactured by Shin-Toh Kagaku as the magnetic tape was moving at a speed of 35 mm/sec with a tape tension of from 10 to 100 g.

(2) dropouts . . . The guide pins were set in a video tape recorder (MACLORD NV 6000 of Matsushita Electric Industrial Co., Ltd.) and the number of dropouts that occurred in a period of one minute was counted with a dropout counter (VD-3 of Victor Company of Japan, Ltd.).

(3) abrasions . . . The development of abrasions on magnetic tape after 200 runs on a MACLORD NV 6000 was visually inspected on a three-grade basis.

o . . . good,
Δ . . . fair,
× . . . not good (4) shaving . . . The surface roughness of the guide pin was measured with a surface roughness meter (SURF-COM-800A of Tokyo Seimitsu Co., Ltd.) both before and after 200 runs on MACLORD NV 6000. The difference in surface roughness was measured by a 3-grade indes.

As is clear from Table 1, the guide pins of this invention (Ex. 1 and 2) were much better than the conventional guide pin (Comp. Ex. 1) in respect of μ value, load dependency of μ value, abrasions, shaving, and dropouts when they had 10,000 to 100,000 spherical projections 0.5 to 5 μm in size in one square milimeter of the outer surface. It was also confirmed that the advantages of the guide means of this invention were exhibited even when other types of magnetic tape were used, and this indicates that the performance of the guide means depends little on the tape type.

What is claimed is:

1. A magnetic tape guide means of cylindrical configuration having formed on the peripheral surface thereof for contact with a moving tape substantially hemispherical projections having diameters or major axis of from 0.5 to 5 μm and a distribution density of from 10,000 to 100,000 projections per square millimeter.

2. A magnetic tape guide means as in claim 1 wherein the material forming the hemispherical projections is selected from the group consisting of a metal and a metal oxide.

3. A magnetic tape guide means as in claim 2 wherein said metal is selected from the group consisting of chromium, nickel, tungsten, and titanium.

4. A magnetic tape guide means as in claim 2 wherein said metal oxide is selected from the group consisting of $Al_2O_3$, $ZrO_2$, $Cr_2O_3$, $\alpha$-$Fe_2O_3$ and $TiO_2$.

5. A magnetic tape guide means as in claim 1 wherein the material comprising said hemispherical projections is an electrically conductive scaly carbon having high hardness.

6. A magnetic tape guide means as in claim 1, 2, 3, 4, or 5 wherein said hemispherical projections are formed on a base member selected from aluminum, brass, ceramic, and glass.

* * * * *